J. B. KOELBLEN.
WATER METER.
APPLICATION FILED JAN. 9, 1909.
972,200.
Patented Oct. 11, 1910.
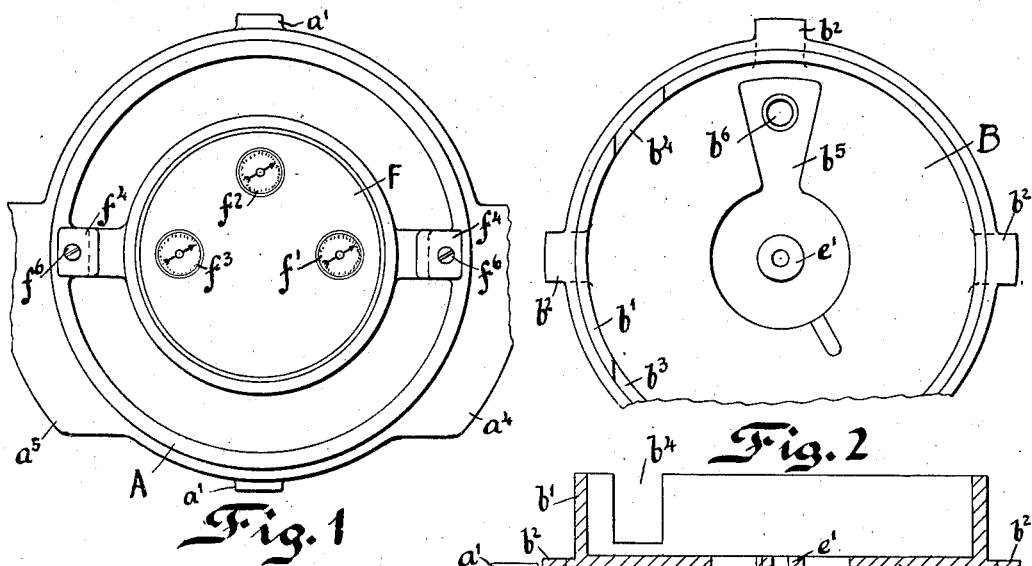
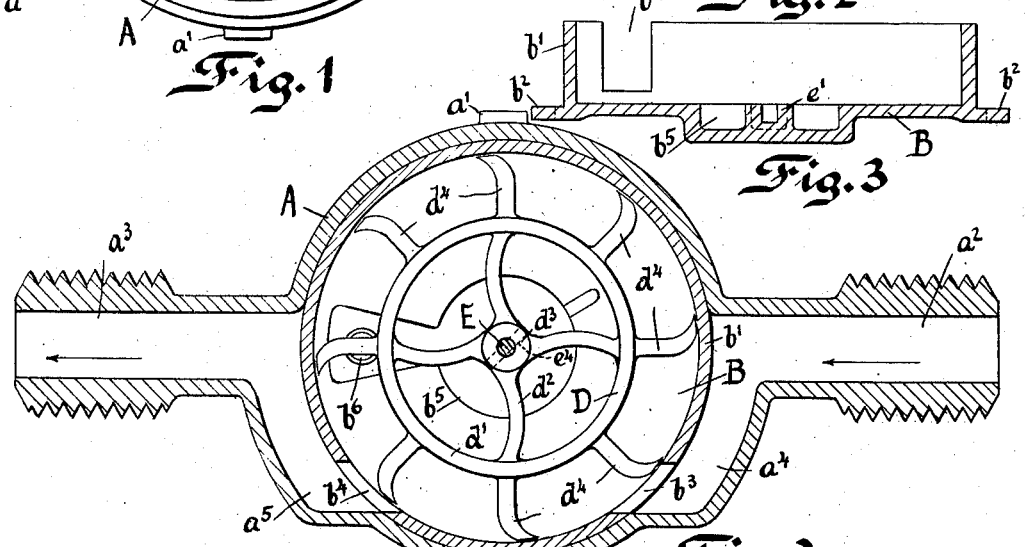
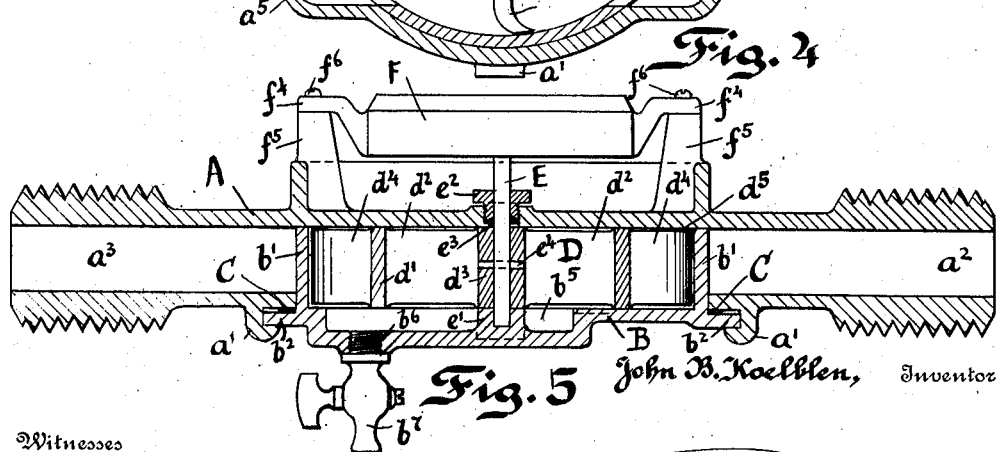
John B. Koelblen, Inventor

UNITED STATES PATENT OFFICE.

JOHN B. KOELBLEN, OF MILWAUKEE, WISCONSIN.

WATER-METER.

972,200. Specification of Letters Patent. Patented Oct. 11, 1910.

Application filed January 9, 1909. Serial No. 471,532.

*To all whom it may concern:*

Be it known that I, JOHN B. KOELBLEN, of Milwaukee, Wisconsin, have invented a Water-Meter, of which the following is a specification.

This invention has for its object to provide a simple, cheap and effective form of water-meter for household use, one which will occupy a minimum of space and can be manufactured at a very low price.

My invention comprises in its essential elements a water-wheel having radial buckets disposed within a closed casing having an inlet and outlet to and from the wheel-chamber at one side thereof, said inlet and outlet being separated by an interval somewhat greater than the spacing of the buckets.

My invention comprises further the constructions and combinations hereinafter described and pointed out in the claims.

In the drawings accompanying this specification, Figure 1 is a plan of one form of water-meter; Fig. 2 is a plan of the interior member of the casing; Fig. 3 is a diametral section therethrough; Fig. 4 is a plan section of the water-meter showing the wheel in position; and Fig. 5 is a longitudinal section of the meter.

The casing of the meter is formed in two parts A and B, the latter of which has a circular flange $b'$ fitting within the member A, and a number of radial projecting lugs $b^2$ (four shown in the drawings) which are adapted to engage under a corresponding set of retainer-lugs $a'$ formed around the edge of the open side of the casing-member A. Between the two members is inserted an annular packing-gasket C to secure tightness.

Within the circular chamber inclosed by the two members A and B is mounted the water-wheel D, which, as shown, has a cylindrical stop-ring $d'$ supported by spokes $d^2$ branching from the hub $d^3$, and upon the periphery of the ring $d'$ are mounted the radial buckets $d^4$. These buckets do not tightly fit the interior of the wheel-chamber, but are set slightly apart therefrom as shown at $d^5$, Fig. 5, to permit a small quantity of water to leak past.

The wheel is mounted upon a central shaft E, which turns in a bearing step $e'$ on the bottom of the casing-member B and in a packing-gland $e^2$ fitted in a central screw-threaded opening in the top of the casing-member A, said gland confining a quantity of packing-material $e^3$ to prevent leakage of water therethrough. This shaft, which is secured fast to the wheel D by a pin $e^4$, may operate the usual registering mechanism, here represented conventionally by a box F containing suitable wheel trains or the like and provided with dials $f'$, $f^2$, $f^3$ for reading the indication of the meter. The dial-box may have ears $f^4$ resting upon posts $f^5$ secured thereto by screws $f^6$. Any form of registering devices may be used, and that shown therefore does not constitute an essential part of my invention.

On opposite sides of the casing A are the inlet and outlet nozzles designated respectively $a^2$ and $a^3$, said nozzles being suitably threaded or provided with other means for connecting to the water-mains. Although these passages are in diametral line with the wheel-chamber, the actual inlet and outlet to the latter are at one side thereof, a construction which is carried out by the two recessed chambers $a^4$ and $a^5$ shown in Fig 4, which extend around to one side of the wheel-chamber; and the inner member B of the casing has notches or openings $b^3$, $b^4$ therein which form in conjunction with the outer casing-member A passages for the water, so that the water passes from the inlet $a^2$ into the chamber $a^4$, through the opening $b^3$, thence across the wheel-chamber, causing the wheel D to rotate in so doing, to the opening $b^4$, thence along the recessed chamber $a^5$ to the outlet $a^3$.

Although two passages are open to the water, to wit around both the longer and shorter arc of the wheel-circle, the shorter arc offers much the lower resistance, and therefore by its friction passing around the edges of the blade gives an impulse to the wheel in the same direction as the flow of water, in comparison with which the impulse caused by any water flowing along the longer arc is negligible. The resistance to movement of the wheel itself being very low, it is found by experiment that up to a certain limit, which is the limiting capacity of the meter, the wheel turns at a rate practically proportional to the rate of flow of water through the meter, so that the registering dials $f^1$, $f^2$ and $f^3$ will correctly integrate the total amount which has passed through the meter.

In the bottom of the inner casing-member B is formed a recess $b^5$ in which any sand or other solid particles carried by the water may collect to prevent them from clogging the wheel and scratching the walls of the chamber. In the bottom of this recess is a threaded orifice $b^6$ to which is attached a pet-cock $b^7$ which is opened when the water is to be drained off from the interior or when the sand and mud accumulated in the recess $b^5$ is to be withdrawn.

Various changes and modifications in the constructions as herein shown may be made without departing from the spirit of my invention, and I wish it understood therefore that the latter is not otherwise limited than by the reasonable scope of my claims.

Having thus described my invention, what I claim as new and desire to secure by Letters Patent is:

1. A water-meter comprising, in combination, a casing comprising an outer and an inner member, one of which has a peripheral flange fitting within the other and forming therewith a cylindrical wheel-chamber, said flange having peripheral diametrically situated inlet and outlet apertures leading to and from said wheel-chamber and separated from one another at an angle less than 180 degrees on the circumference of said wheel-chamber, a wheel mounted within said chamber, a shaft on which said wheel is secured and a registering mechanism operated by said shaft; said casing having on opposite sides of said wheel-chamber bearings in the center of each of its members in which said shaft turns.

2. In a water-meter, the combination of two casing-members fitting one within the other to form a cylindrical wheel-chamber and having peripheral inlet and outlet passageways, a wheel-shaft pivotally mounted in said casing-members, and a wheel mounted on said shaft within said wheel-chamber; the inner casing-member having in the bottom thereof a depression which forms a collecting-chamber for solid particles and recessed chambers extending around upon opposite sides of the wheel chamber and a drainage outlet connected with said collecting-chamber.

3. A water-meter comprising, in combination, two casing-members which fit one within the other forming a cylindrical wheel-chamber, the outer one of said members having diametrally situated inlet and outlet passages, circumferential recesses in the walls of said member communicating with said passages at one end and lying on the same side of said passages; said inner member having openings in the cylindrical flange thereof registering with the opposite ends of said recesses, said recesses forming in conjunction with the walls of said inner member and said openings therein passages leading circumferentially from said first-named passages and opening into said wheel-chamber at a short circumferential distance from said first named passages; a shaft pivotally mounted centrally upon said casing-members, and a wheel mounted on said shaft within said chamber; said wheel having a cylindrical stop-ring at a point distant from the hub thereof and substantially extending across said wheel-chamber so that any water through the chamber must pass circularly around the same; and said wheel having a plurality of radial buckets which nearly but not quite fill the circumferential space of the wheel-chamber between the walls thereof and said stop-ring, whereby water passing through the chamber produces an impulse acting tangentially upon said wheel.

4. A water-meter comprising, in combination, two casing-members which fit one within the other forming a cylindrical wheel-chamber, the outer one of said members having diametrally situated inlet and outlet passages and circumferential recesses in its walls communicating with said passages at one end and lying on the same side of said passages; said inner member having openings in the cylindrical flange thereof registering with the opposite ends of said recesses, said recesses forming in conjunction with the walls of said inner member and said openings therein passages leading circumferentially from said first-named passages and opening into said wheel-chamber at a short circumferential distance from said first-named passages; a shaft pivotally mounted centrally upon said casing-members, and a wheel mounted on said shaft within said chamber.

5. A water meter comprising in combination two casing members fitting one within the other and forming a cylindrical wheel chamber, the outer one of said members having diametrically situated inlet and outlet passages and circumferential recesses in its wall communicating with said passages at one end and lying on the same side of said passages, said inner member having openings therein registering with the opposite ends of said recesses, a shaft mounted centrally upon said casing members, and a wheel mounted on said shaft within said chamber.

6. In a water meter, two casing members fitted one within the other and forming a cylindrical wheel chamber, the outer one of said members having diametrically situated inlet and outlet passages and circumferential recesses in its walls communicating with said passages at one end and lying on the same side of said passages, said inner member having openings therein registering with the opposite ends of said recesses, said recesses forming in conjunction with the walls of said inner member and said openings therein passages leading circumferentially from said first-named passages and opening into said wheel chamber at a short circumferential distance from said first-named passages.

In witness whereof, I have hereunto set my hand this twenty-sixth day of December, 1908.

JOHN B. KOELBLEN.

Witnesses:
GEORGE WETMORE COLLES,
WILHELMINA D. SCHIENBEIN.